United States Patent [19]

Anderson et al.

[11] Patent Number: 4,644,662

[45] Date of Patent: Feb. 24, 1987

[54] CAPACITIVE GRAVITY SENSOR

[75] Inventors: Jane E. Anderson, Phoenix; Harold L. Swartz, Glendale; Mario DiMarco, Phoenix, all of Ariz.

[73] Assignee: Sperry Corporation, New York, N.Y.

[21] Appl. No.: 870,646

[22] Filed: Apr. 29, 1986

Related U.S. Application Data

[63] Continuation of Ser. No. 696,625, Jan. 3, 1985.

[51] Int. Cl.[4] ............................................. G01C 9/06
[52] U.S. Cl. ....................................... 33/366; 340/689
[58] Field of Search ............ 33/366; 340/689, 870.37; 324/61 R, 61 P; 73/304 C; 361/323, 324, 433 E, 280

[56] References Cited

U.S. PATENT DOCUMENTS

| 3,221,226 | 11/1965 | Kennedy et al. | 361/324 |
| 3,812,039 | 5/1974 | Niwa | 361/433 E |
| 3,906,471 | 9/1975 | Shawhan | 33/366 |
| 4,028,260 | 6/1977 | Zuest | 33/366 |
| 4,350,040 | 9/1982 | Fasching et al. | 73/304 C |
| 4,377,912 | 3/1983 | Hakhverdian | 33/366 |
| 4,434,209 | 2/1984 | Sasaki et al. | 361/323 |
| 4,454,567 | 6/1984 | Ross et al. | 361/433 E |
| 4,477,860 | 10/1984 | Wason et al. | 340/870.37 |

Primary Examiner—Charles Frankfort
Assistant Examiner—Patrick R. Scanlon
Attorney, Agent, or Firm—Howard P. Terry; Seymour Levine

[57] ABSTRACT

An inclinometer includes two coplanar electrodes positioned within a chamber of a metallic housing containing a high relative dielectric constant fluid and a gas. With the inclinometer positioned on a level surface equal areas of the two electrodes are immersed in the dielectric fluid creating two equal capacitors formed by the electrodes and the metallic housing. When the inclinometer is rotated through an inclination angle, unequal areas of the electrodes are immersed in the fluid causing a capacitance differential that is a measure of the inclination angle.

5 Claims, 6 Drawing Figures

CAPACITIVE GRAVITY SENSOR

This is a continuation of co-pending application Ser. No. 696,625 filed on Jan. 3, 1985 and now abandoned.

BACKGROUND OF THE INVENTION

1. Field of the Invention

The invention relates to inclination sensing instruments and more particularly, to an instrument that provides variable capacitance as a function of inclination angle.

2. Description of the Prior Art

A carpenter's level comprising a transparent tube partially filled with a fluid, such that an air bubble exists within the fluid, has long been employed for determining deviations from the horizontal. These devices in the simplest forms, though inexpensive, do not furnish accurate measures of inclination angle but merely provide an indication of the deviation from the horizontal of a reference surface. For many applications such indications are adequate, while for others accurate measures of the inclination angles are necessary.

Inclination sensing instruments, based on the bubble in a liquid concept, that utilize capacitor variations caused by variable positions of the bubble have been employed to determine deviations from the horizontal. One such device has three, electrically isolated, aluminum foil electrodes covering the liquid containing vial. One electrode is a reference electrode that covers the entire outside of the vial except for the surface over the bubble path. The other two electrodes, each as long and as wide as the bubble, are symmetrically positioned over the bubble path on either side of the vial center. The liquid in the vial has a higher dielectric constant relative to that of the air bubble, thereby establishing a difference in capacitance between the capacitance formed by one sensing electrode and the reference electrode and the capacitance formed by the other sensing electrode and the reference electrode that is a function of the position of the bubble. This device exhibits a linearity and an accuracy that is a function of the location of the sensing electrodes on the vial and the bubble size, which may vary with the fluid temperature.

Other tilt indicating devices of the prior art utilize gravity type potentiometers. One such apparatus comprises a resistance wires axially positioned in a V shape or circular tube containing a conducting fluid extending to a given level above the lowest point of the tube. Two equal end segments of resistance wire, extending from the conducting fluid to each end, are formed when the device is coupled to a horizontally positioned referenced surface, thus providing wire segments of equal resistance. Tilting this reference surface from a horizontal orientation causes the tube to rotate, establishing wire segments between the conducting fluid and the ends that are of unequal length and resistance. The accuracy of these devices depend on the tolerances maintained on the resistance of the wire, while the stability is a function of the temperature coefficient of resistivity of the wire and temperature coefficient of expansion of the fluid.

The present invention provides a reliable inclinometer comprised of two capacitors having differential capacitor variations that are linear with tilt angle.

SUMMARY OF THE INVENTION

An inclinometer in accordance with the present invention includes a chamber within a metallic housing partially filled with fluid which has high relative dielectric constant. Two coplanar, equally shaped and dimensioned, electrically isolated metallic sheets sandwiched between two sheets of dielectric material are positioned in the chamber and the remainder of the chamber is filled with a gas having a relative dielectric constant that is less than that of the fluid. Each of the coplanar dielectric sheets is a sensor plate of a capacitor that is formed with the metallic housing. These capacitors have equal capacitance when the fluid immersed area of one is equal to the fluid immersed area of the other, signifying that the inclinometer is in a horizontal position. A deviation of the inclinometer from the horizontal position causes the immersed areas of the two sensor plates to differ creating a capacitance differential between the two capacitors. This capacitance differential may be utilized to establish an electrical signal representative of the inclination angle.

DESCRIPTION OF THE PREFERRED EMBODIMENTS

Figure 2:
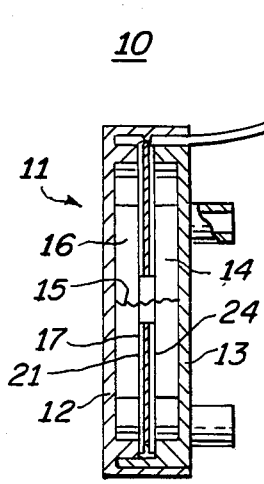
FIG. 2 is a cross sectional view of the embodiment of FIG. 1 along the line 2—2 in FIG. 1A.
Figure 1A:
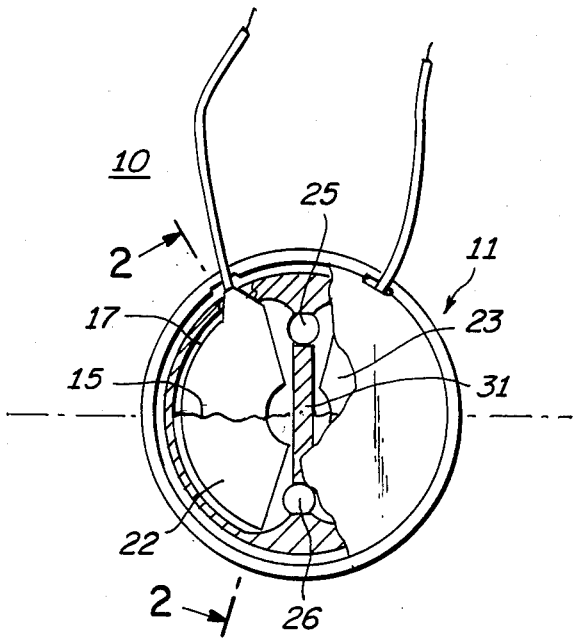
FIGS. 1A and 1B are cut away views of one embodiment of the invention.
Figure 3:
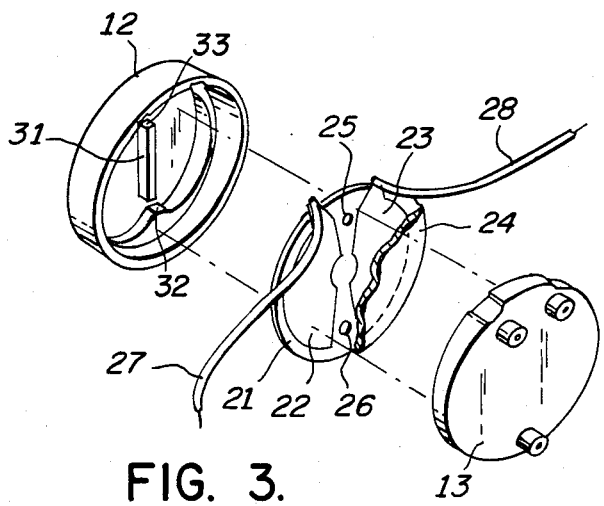
FIG. 3 is a parts assembly drawing for the embodiment of FIG. 1.

Referring to FIGS. 1A, 2, and 3 wherein corresponding elements are assigned the same reference numeral, there is shown an embodiment of the invention generally designated 10 including a housing 11 of two part construction 12 and 13, forming a fluid container 14 therein. The fluid container 14 contains a liquid, as for example a mixture of hydrocarbon oil possessing a high dielectric strength and an alcohol possessing a high dielectric constant, to a level 15 and a gas atmosphere 16, as for example nitrogen, in the remainder of the chamber 14. A laminated disk 17 is positioned in the fluid container 14 equal distance from the housing halves 12 and 13 to form two fluid chambers. This laminated disk 17 may be constructed by plating a sheet of dielectric material, as for example, 0.003 inch thick polyester 21 with copper and chemically etching the copper to form two electrically decoupled plates 22 and 23 to the desired form. After the etching operation a second sheet of polyester 24 may be bonded to the first polyester sheet 21 and etched copper electrodes 22 and 23 to sandwich the copper between sheets of polyester. The sandwich so formed covers the two plates 22 and 23 on both sides completely with the dielectric sheets 17 and 21. Holes 25 and 26 are bored through the laminated structure to provide passages for the equalization of fluid and gas pressures in the chamber 14.

Figure 4A:
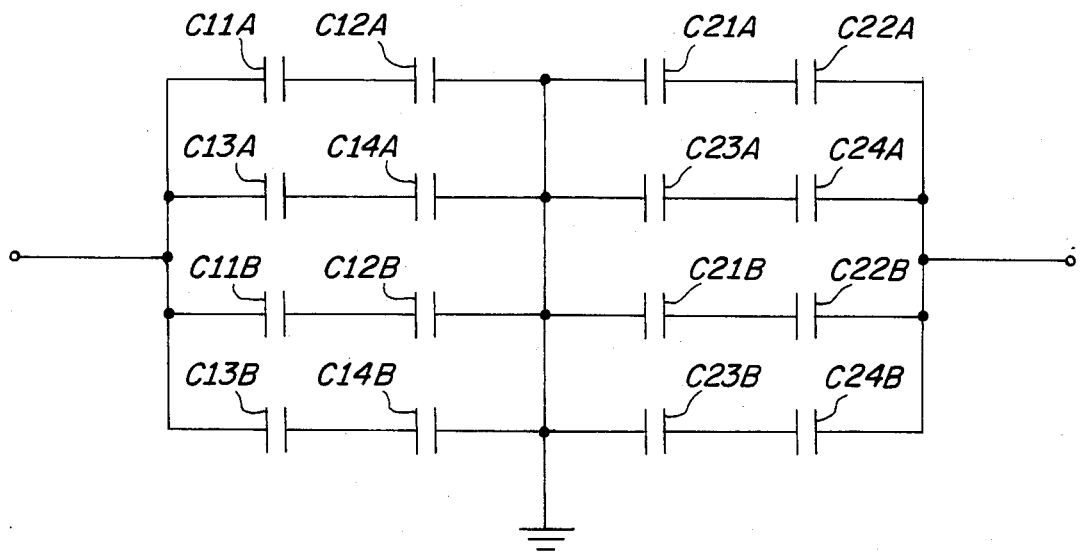
FIG. 4A is a representation of the capacitors formed by the housing, polyester sheets, and the copper electrodes of FIGS. 2 and 3.

The combination of metallic housing 11, polyester sheets 21 and 24, and copper electrodes 22 and 23 establish a series parallel combination of capacitors as shown in FIG. 4A. Those skilled in the art will recognize that the capacitor C11A is representative of the capacitance between the copper plate 22 and the polyester sheet 21—fluid boundary and that the capacitor C12A is representative of the capacitance between this boundary and the metallic housing 11 which may be considered as a ground electrode. These capacitors are in parallel with the series combination of capacitor C13A representative of the capacitance between the copper electrode 22 and the polyester sheet 24—fluid boundary and the capacitance C14A between this boundary and the metallic housing 11. Similarly, capacitors C11B and C13B are representative of the capacitance across the polyester sheets 21 and 24 in the gas region, while capacitors C12B and C14B are representative of the capacitance between the polyester sheet—gas boundary and the metallic housing 11. It should be apparent to those skilled in the art that capaciators C21A-C24A and C21B-C24B are similarly formed between the copper electrode 23 and the metallic housing 11.

Figure 4B:
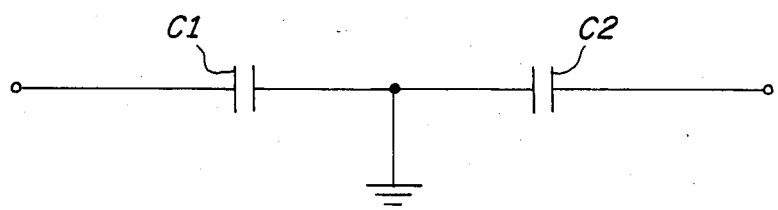
FIG. 4B is the resultant electrical circuit after combining the capacitors of FIG. 4A.

The combination of series and parallel capacitors, formed between the copper electrode 22 and the metallic housing 11, may be represented as a single capacitance C1 while the combination of capacitors formed between the copper electrode 23 and the metallic housing 11 may be represented as a single electrode C2 and shown in FIG. 4B. Grounding of the capacitors indicated in FIGS. 4A and 4B is representative of the metallic housing 11 to ground. Access to the two capacitors C1 and C2 is achieved through leads 27, 28 respectively coupled to the copper electrodes 22 and 23, while electrical isolation between capacitors C1 and C2 is achieved by positioning a metallic partition 31 extending from the metallic housing 11 for a distance which is no greater than the distance between the metallic housing 11 and the laminated disk 17. This partition is positioned to have a projection in the metal free region between the copper electrodes 22 and 23 formed by the etching process. Partition 31 runs along the housing for the length of the two electrodes, being interrupted only by fluid passages 32 and 33, which are aligned with the holes 25 and 26 to allow gas and fluid to pass between the fluid chambers.

Figure 1B:
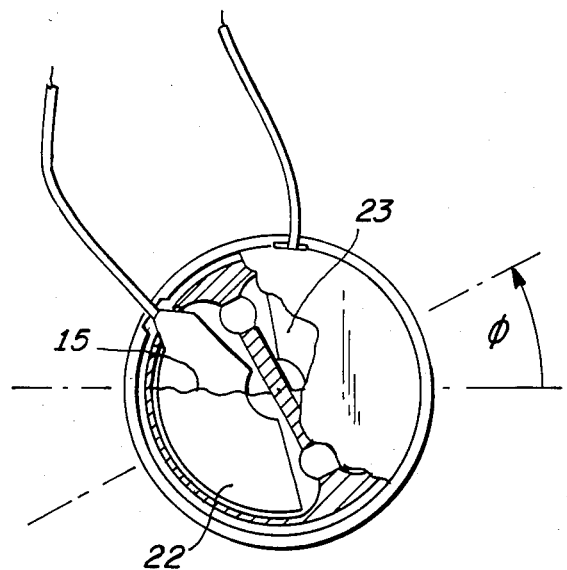

When the sensor is appropriately coupled to a horizontal reference surface equal areas of the copper electrodes 22 and 23 are immersed in the fluid and the capacitors C1 and C2 are equal. When the surface is inclined by an angle 0, as shown in FIG. 1B, the sensor is tilted through an equal angle. Due to gravitational forces the liquid level 15 remains unaltered, however the copper electrodes 22, 23 are rotated such that one electrode, electrode 22 as shown in FIG. 1B, has a greater area immersed in the fluid than the other. Since the dielectric constant of the fluid is greater than that of the gas the capacitance C1 associated with the copper electrode 22 at the angle 0 is greater than the capacitance C2 associated with the copper electrode 23. This capacitance differential may be utilized to determine the inclination angle 0.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An inclinometer comprising:
    a housing having a fluid container therewithin formed by first and second metallic outer walls and a metallic perimeter;
    a first sheet of dielectric material positioned within said fluid container at a preselected distance from said first metallic outer wall to form a first fluid chamber bounded by said first sheet of dielectric material, said first metallic outer wall, and said metallic perimeter;
    a second sheet of dielectric material positioned within said fluid container in a parallel relationship with said first sheet of dielectric material at a distance from said second metallic outer wall that is equal to said preselected distance to form a second fluid chamber bounded by said second sheet of dielectric material, said second metallic outer wall, and said metallic perimeter;
    first and second coplanar, electrically decoupled, metallic sensor plates positioned in a plane located between said first and second sheets of dielectric material to form a laminated disk, said first and second metallic sensor plates being completely covered by said first and second sheets of dielectric material, said first and second metallic sensor plates having a separation distance therebetween to provide a metal free region in said plane defining an area having a predetermined length;
    a fluid, having a preselected dielectric constant, contained in said first and second fluid chambers at equal predetermined levels; and
    a gas having a dielectric constant less than said preselected dielectric constant filling areas in said first and second fluid chambers not containing said fluid.

2. An inclinometer in accordance with claim 1 wherein said dielectric material is polyester.

3. An inclinometer in accordance with claim 1 wherein said laminated disk contains holes therethrough for linking said first and second fluid chambers to provide passages for said fluid and said gas to equalize gas and fluid pressure between said first and second fluid chambers.

4. An inclinometer in accordance with claim 3 further including a metallic partition extending from at least one of said first and second metallic walls of said housing towards said plane for a distance that is not greater than said preselected distance and positioned such that an imaginary geometric projection of said metallic partition in said plane is in said metal free region between said first and second metallic sensor plates, said metallic partition having a length equal to said predetermined length of said area in said metal free region and having fluid passages therein aligned with said holes in said laminated disk.

5. An inclinometer in accordance with claim 1 wherein said gas is nitrogen and said fluid comprises a mixture of a hydrocarbon and an alcohol.

* * * * *